United States Patent [19]
Randa

[11] Patent Number: 5,171,635
[45] Date of Patent: Dec. 15, 1992

[54] COMPOSITE WIRE CONSTRUCTION

[75] Inventor: Stuart K. Randa, Wilmington, Del.

[73] Assignee: E. I. Du Pont de Nemours and Company, Wilmington, Del.

[21] Appl. No.: 596,983

[22] Filed: Oct. 10, 1990

[51] Int. Cl.⁵ .................... H01B 7/18; H01B 3/04; B32B 27/00; D02G 3/00

[52] U.S. Cl. .................... 428/383; 428/376; 428/379; 428/380; 174/102 C; 174/103; 174/110 SR

[58] Field of Search .............. 428/381, 383, 379, 103; 174/110 FC, 104 SR, 120 SR, 102 C

[56] References Cited

U.S. PATENT DOCUMENTS

| | | | |
|---|---|---|---|
| 2,691,694 | 10/1954 | Young | 174/110 FC |
| 3,900,701 | 8/1975 | Bayles et al. | 174/102 |
| 4,045,611 | 8/1977 | Torgerson | 174/121 SR |
| 4,088,830 | 5/1978 | Wargin et al. | 174/113 R |
| 4,515,993 | 5/1985 | Mackenzie | 174/102 R |
| 4,761,520 | 8/1988 | Wade, Jr. et al. | 174/121 R |
| 4,801,501 | 1/1989 | Harlow | 428/383 |
| 4,877,923 | 10/1989 | Sahakian | 174/110 FC |

OTHER PUBLICATIONS

D. L. G. Sturgeon et al., High Modular Organic Fibers, 1978, p. 511.
Published European Pat. Appln. 0125747.

*Primary Examiner*—Patrick J. Ryan
*Assistant Examiner*—Richard C. Weisberger

[57] ABSTRACT

A wire construction comprising an electrically conductive core, two polymeric insulation layers and a layer of fiber braid between the insulation layers, characterized by excellent flexibility and resistance to cut-through and arc propagation.

5 Claims, No Drawings

COMPOSITE WIRE CONSTRUCTION

BACKGROUND OF THE INVENTION

This invention relates to insulated electrical conductors which can be used as interconnecting or hookup wire or as components of multiconductor cables.

Many performance criteria are important in an insulated electrical wire. A number of such criteria that are especially important in the aircraft industry, include weight and space; arc-track resistance; abrasion and cut-through resistance; temperature rating; flexibility and stiffness; smoke generation and flammability; and chemical resistance.

The relative importance of these criteria varies with the particular application, and it may not be possible to have one insulation system that is the best in all respects. For example, good abrasion resistance and high cut-through resistance are usually obtained with high modulus materials, whereas better flexibility and low-springback generally require low modulus materials. Consequently, insulation systems offer different balances of properties, excelling in different respects.

In the effort of researchers to find a better balance of properties, two main approaches have been followed. First, effort has been devoted to the development of new or modified materials with improved insulating properties. In this regard, fluoropolymers and polyimides have been widely used. Secondly, combinations of materials have been evaluated in attempts to realize in the composite the better properties of the various components. For example, braided fibers have been used as an external jacketing to improve mechanical properties and protect underlying insulation.

Despite many earlier attempts to develop insulating systems, a need exists to satisfy the demands of increasingly complex electrical and electronic systems used in industrial and aerospace applications.

SUMMARY OF THE INVENTION

The present invention provides a wire construction that exhibits an outstanding balance of performance characteristics, including weight and space; arc-track resistance; abrasion and cut-through resistance; temperature rating; flexibility and stiffness; smoke generation and flammability; and chemical resistance. This construction can be used by itself, as the core of a more elaborate single-wire construction, or in multiconductor cables.

Specifically, the instant invention provides a wire construction comprising a metallic electrically conductive core, a first polymeric insulation layer surrounding the conductive core, a layer of fiber braid surrounding the first insulation layer, and a second polymeric insulation layer surrounding the braid.

Preferably, the braid is impregnated with a resin.

DETAILED DESCRIPTION OF THE INVENTION

The electrically conductive core of the present invention can prepared from a wide variety of known materials which meet the temperature rating of the wire or the process temperature requirements for application of the insulation. Typical of those which can be used are copper, either alone or plated, to prevent oxidation of the copper, with tin, silver, nickel, silver-nickel or other metals, depending on end use temperature requirements. The conductive core can be either solid, i.e., a single strand of metal, or multi-stranded. Multi-strand structures are preferred in the present invention. While the number of strands will vary with the specification and conductor size, a strand count of nineteen is common.

The size of the conductive core can vary widely, but is typically in the range American Wire Gauge (AWG) of about from 30 to 10. For 19-strand conductors, AWG 30 has a diameter of about 0.0124 inch and AWG 10 has a diameter of about 0.111 inch.

The first insulation layer on the conductive core is a polymeric resin having electrical insulating characteristics suitable for the application to which the insulated wire is intended. Fluoropolymers have been found to be particularly well suited to the present constructions, and are accordingly preferred. A wide variety of fluoropolymers can be used in the present invention, including non-melt-fabricable polymers of tetrafluoroethylene (TFE) such as polytetrafluoroethylene (PTFE) and polymers of TFE with up to 1% of a modifying comonomer. Melt-fabricable fluoropolymers which can be used include PFA (a copolymer of TFE with one or more perfluoroalkyl vinyl ethers); FEP (copolymer of TFE and hexafluoropropylene); melt fabricable copolymers of TFE, perfluoroalkyl vinyl ethers (PAVE), and one or more additional monomers including HFP; ETFE (copolymers of ethylene (E) and TFE), usually incorporating minor amounts of one or more modifying comonomers such as hexafluoroacetone, perfluorobutyl ethylene, hexafluoroisobutylene, PAVE, or HFP; copolymers (ECTFE) of E and chlorotrifluoroethylene (CTRE), also with modifying comonomers; and polyvinylidenefluoride.

Polyimides can also be used for the first insulation layer. The polyimide films may have a fluorocarbon polymer such as FEP, PFA, or ETFE on one or both surfaces as a melt adhesive. Polyimide films which can be used include those commercially available from the Du Pont Company as "Kapton" polyimide film.

Other materials which can be used for the insulation layer of the present constructions will be readily apparent to those skilled in the art, depending on the electrical and mechanical properties desired in the final product.

The thickness of the first insulation layer can vary widely, depending on the size of the core and the desired degree of insulation. For example, for AWG 22, a thickness of about from 0.5 to 5 mils is typically used.

If the material used for the first insulation layer is in the form of thin film tape, a surface treatment can be used to place it in a category known as cementable film. The choice of the specific material for the first insulation layer, as for the other components to be described below, will be governed by the balance of electrical, mechanical, thermal, and chemical properties desired in the final construction, dimensional and weight constraints considered.

The first insulation layer can be applied by any of several techniques known to those skilled in wire construction operations. An especially convenient way to apply a thin layer is to use the resin in the form of thin film tape and wrap the tape helically around the conductor, with a predetermined amount of overlap. The first insulation layer can also be formed by extrusion techniques, or by depositing resin from dispersions and removing the carrier fluid.

A fusion step can be used to achieve sufficient integrity for the first insulation layer to withstand subsequent processing steps. This can be accomplished by heating the layer to a temperature above the melting point of the resin.

The next layer of the present constructions, the braid of high strength fibers, is applied directly over the first insulation layer by braiding techniques well known in the art. Fibers which can be used for this component include, for example, high strength fibers of PTFE; polyaramids, such as those commercially available from the Du Pont Company as "Kevlar" aramid fiber; polyimides; and glass. The braid can be made from fibers of single type, or a mix of fiber types can be used in the braid construction.

In some cases, it may be desirable to treat the surface of the fibers to promote the formation of a bond between the fibers and other materials used in the present construction. For example, PTFE fibers can be treated by sodium etching or other techniques known to produce a bondable surface. One etchant material which can be so used is TetraEtch, commercially available form W. L. Gore & Associates, Inc. Glass fiber can also be treated with an adhesion promoter such as a silane.

The fiber braid is preferably impregnated with one or more polymers to facilitate a void-free construction and the bonding of the layers in the final construction. The polymer can be applied to the fiber braid in the form of an aqueous dispersion or organosol of the fluorocarbon polymer resin, or with a polymer solution. Volatile components of the dispersion or organosol are then removed. Partial fusion of the fluorocarbon resin particles to each other and/or to the fiber braid can be accomplished, if desired, by heating the resin particles above their melting point for a short time. Fluorocarbon polymers which can be used for impregnating the fiber braid include dispersion forms of the fluorocarbon polymer resins discussed above as useful for the first insulation layer. Mixtures of certain resin dispersions might also be useful.

Other polymers which can be used for impregnation include polyimides, which can be used in the form of a solution of the polyimide resin in n-methyl pyrolidone.

The quantity of the polymer used to impregnate the braid can vary widely, depending on the thickness and construction of the braid.

In one alternative method of preparing the conductive structures of the present invention, the braid can be prepared from a high strength fiber yarn which has been impregnated with a polymer resin prior to braiding over the first insulation layer.

The second insulation layer in the present constructions can be selected from the same polymers discussed above for the first insulation layer. The second insulation layer can be the same as or different from the first.

The second insulation layer can be pigmented to achieve a color of choice or specification, or may incorporate a filler to achieve various purposes. If the second insulation layer is a polyimide, a pigmented overcoat of fluorocarbon polymer dispersion or organosol or of polyimide solution can be used.

The second insulation layer can applied over the fiber braid by wrapping thin film tapes or by extrusion according to the techniques used for the first insulation layer. The thickness of the second insulation layer will typically be the same as the first insulation layer.

The composite construction is usually fused by heating the construction above the melting point of the thermoplastic components used in the construction. This step enhances the sealing of the braided fibers by the resin impregnant and promotes a melt bond to the first and second insulation layer to achieve an integral composite structure.

The resulting composite structure is non-wicking to fluids. Fusion in this step, as in the optional partial fusion of the impregnant resin discussed above, may be at a temperature above or below the melting point of the fibers used in the braided layer, depending on the choices of materials. However, if PTFE fibers are used in the braid and no fusion step after braid impregnation is carried out at a temperature above the melting point of PTFE, then the fibers are preferably etched as described above, or otherwise surface treated to facilitate bonding.

The final fusion step should also be carried out under conditions that will achieve wrap-to-wrap sealing of the second insulation layer, if polymer film tape is used for this component.

The present constructions can also be treated by irradiation to modify one or more of the components that may be susceptible to crosslinking. Crosslinking can improve the high temperature properties of some polymers. If desired, irradiation can be carried out on either the final construction or at an intermediate stage of the construction. While the level of radiation will vary with the particular material used, about from 5 to 25 megarads are typically used for ETFE resin without crosslinking promoters.

Many variations can be used within the concept of the present invention, as will be recognized those skilled in the art. For example, if a thin film tape is used for an insulation layer, multiple wraps can be applied. It is not necessary that the first and second second insulation layers be of equal thickness. In larger wire sizes, thicker insulations are frequently desired and the braid can be present as two or more layers, optionally separated by layer of film.

The materials for the first insulation layer, the fiber braid, the impregnating resin, and the second insulation layer can be chosen independently in any combination. However, it will be recognized that in practice certain combinations will be preferred depending on performance and cost criteria, and certain combinations might best be avoided because of interactive considerations. For example, a polyimide solution would normally not be used to impregnate the fiber braid when the first or second insulation layer is PTFE because of the general lack of adhesion between these materials. The choice of the impregnating polymer should be made to achieve melt solidification of the components to a fused composite. For example, a construction rated at 150° C can be made with PTFE as the material for the first insulation, polyaramid fiber braid with PTFE dispersion impregnation, and ETFE as the material for the second insulation. Further, radiation crosslinking of the ETFE in this construction would increase its temperature rating to approximately 200° C.

Another illustrative combination of materials, to provide a construction rated at 180°-200° C., is FEP for the first insulation, polyaramid fiber braid with FEP dispersion impregnation, and FEP for the second insulation. A construction rated at 260° C. can be obtained with a variety of materials, including the combinations suggested in Table 1.

TABLE 1

| Possible Construction for 260° C. Rating | | | |
|---|---|---|---|
| First Insulation | Braid Fiber | Impregnating Resin | Second Insulation |
| PFA | Polyimide | PFA | PFA |
| PFA | PTFE | PFA | PFA |
| PTFE | PTFE | PFA | PFA |
| PFA | PTFE | PFA | Polyimide |

The constructions of the present invention provide an outstanding combination of performance characteristics at a low weight and volume. Specifically, the constructions of the present invention exhibit excellent cut-through resistance and arc-propagation performance at surprisingly thin wall thicknesses.

The foregoing description, and the following specific Examples, are not exhaustive, and a wide variety of other combinations within the scope of this invention will be readily apparent to those skilled in the art. In these Examples and Comparative Examples, the following test procedures were used.

TEST PROCEDURES

Two principal tests were used to evaluate the performance of wire constructions. These are a cut-through test to assess mechanical performance and an arc propagation test to assess electrical insulating properties.

Cut-through testing was conducted at room temperature (approximately 23° C.) and at 150° C. according to the procedures of ASTM D-3032.

The arc propagation test is conducted as follows: Using insulated wires with AWG 20 or 22 conductor, a seven-wire harness is formed with six wires around the seventh in a symmetrical bundle and tied with nylon ties. A 400-Hertz rotary 3-phase converter of 15 KVA capacity is connected to one end of the test harness according to the following pattern. The 1st and 4th outer wires are connected to Phase A; the 2nd and 5th outer wires are connected to Phase B; the 3rd and 6th outer wires are connected to Phase C; and the center wire of the harness is connected to neutral (ground). At the other or test end of the harness, the wires are cut off evenly in a plane perpendicular to the axis of the harness. The test end of the harness is dipped in graphite powder, forming a potential short (loose fault). The harness is hung vertically with the test end at the bottom in an electrically protective vented chamber. A timer is set for power-on duration of 10 seconds. The power contactor and timer are energized to initiate an arc at the test end face of the wire harness. The resulting arc will either self-extinguish after the initial flash or sustain itself until a portion or all of the harness is consumed or the power is shut off by the timer or manually. When the arc propagates along the harness, the power is usually removed manually after approximately 3 seconds to conserve the sample. After the arc has extinguished, the power switches are opened, the timer is reset, and after approximately 5 seconds power is reapplied for a second event. If the arc does not propagate along the harness, or propagates only a short distance, the harness is cut back approximately one inch from the original end and another test is run on the same harness. This procedure is repeated until 10 tests have been run on a sample. Arc propagation either on initial application of power or on reapplication of power is considered a test failure.

EXAMPLES 1-7 and COMPARATIVE EXAMPLES A-E

In Examples 1-7 and Comparative Examples A-E, wire constructions with AWG 22 stranded conductor were prepared. The materials and construction procedures used in Examples 1-7 are summarized in Table 2 and the accompanying notes.

In Comparative Examples A-E, the general construction procedures of Examples 1-7 were repeated, using the materials summarized in Table 3.

The constructions of Examples 1-7 and Comparative Examples A-E were tested for cut-through and arc propagation, and the results are summarized in Table 4.

The data relating to Examples 1-4 show superior cut-through resistance when compared to the constructions of Comparative Examples A-C at comparable wall thicknesses, or comparable cut-through resistance at significantly thinner wall thicknesses, while retaining resistance to arc propagation. Examples 6-7 show substantially increased cut-through resistance over Comparative Example D while retaining resistance to arc propagation. Examples 5-7 show cut-through resistance comparable to the outstanding performance of Comparative Example E, and simultaneously achieve resistance to arc propagation markedly superior to that of Comparative Example E. In addition, the constructions of the present invention are more flexible than those of Comparative Example E, which incorporates a high modulus material.

TABLE 2

| | Composite Wire Constructions with Mid-Wall Fiber Braid | | | | |
|---|---|---|---|---|---|
| Ex. | First Insulation | Braid Fiber | Dispersion Impregnant | Second Insulation | Total Wall Thickness (mil) |
| 1 | PFA Film | PTFE | PFA | PFA Film | 7 |
| 2 | PFA Film | PTFE | PFA | PFA Film | 7 |
| 3 | PFA Film | PTFE | PFA | PFA Film | 7 |
| 4 | PFA Film | PTFE/ polyaramid | PFA | PFA Film | 7 |
| 5 | PFA Film | Polyaramid | PFA | PFA Film | 7 |
| 6 | ETFE Film | Polyaramid | ETFE | ETFE Film | 6 |
| 7 | Same as Ex. 6, except radiation crosslinked with 18 Mrad. | | | | 6 |

Note
(a) The PFA film used was Du Pont's "TEFLON" PFA-fluorocarbon film grade 100CLP20, thickness 1.2 mil, width 7/32 and 8/32 inch for the first and second insulation layers, respectively. This film is a cementable grade.
(b) The ETFE film used was Du Pont's "TEFZEL" fluoropolymer film grade 100CLZ20, thickness 1.0 mil, width 7/32 and 8/32 inch for the first and second insulation layers, respectively. 100CLZ20 is a cementable grade.
(c) Films were helically wrapped with 50% overlap.
(d) The first insulation layer wraps were fused at 327° C. for 1.5 minute for PFA, 288° C. for 1.5 minute for ETFE.
(e) The PTFE fiber used was Du Pont's "TEFLON" TFE-fluorocarbon fiber in 400 denier yarn. For Example 1 only, the fiber yarn was sodium etched with Gore's TetraEtch following the manufacturer's directions.
(f) The polyaramid fiber used was Du Pont's "KEVLAR" aramid fiber type 49 in 195 denier yarn.
(g) For Example 4, the PTFE and aramid yarns were supplied on separate bobbins.
(h) The fiber yarns were braided onto the wire with a cross-braiding pattern. Braid thickness was 4.0 mil for PTFE, 3.5 mil for aramid, and 4.5 mil for the PTFE/aramid combination. The PTFE compressed more than the aramid during subsequent processing.
(i) The PFA dispersion used was Du Pont's "TEFLON" PFA-fluorocarbon resin dispersion grade 335.
(j) The ETFE dispersion used was Hoechst's grade ET6425.
(k) PFA dispersion impregnations were cured at 316° C. for 10 minutes for Examples 1 and 3, at 349° C. for 0.5 minute for Example 2, and by air drying for Examples 4 and 5.
(l) ETFE dispersion impregnations were cured by air drying.
(m) Following the second insulation layer wrap, final cure was at 327° C. for 1.5 minute for PFA, 288° C. for 1.5 minute for ETFE.

TABLE 3

Comparison Wire Constructions

| Ex. | Insulation | Total Wall Thickness (mil) |
|---|---|---|
| A | PFA tape 1.2 mil thick, 3 wraps | 7 |
| B | Modified PTFE extrusion | 10 |
| C | Modified PTFE extrusion with 0.5-mil polyimide enamel overcoat | 12.5 |
| D | ETFE tape 1.0 mil thick, 3 wraps | 6 |
| E | Polyimide tape 1.2 mil thick, 2 wraps, with 1-mil polyimide enamel overcoat | 6 |

TABLE 4

| | Cut-Through Force (lb) | | |
|---|---|---|---|
| Ex. | 23° C. | 150° C. | Arc Propagation |
| 1 | 14 | 5 | (a) |
| 2 | 12 | 5 | (a) |
| 3 | 15 | 6 | (a) |
| 4 | 17 | 5 | No |
| 5 | 81 | 25 | No |
| 6 | 90 | 13 | NO |
| 7 | 80 | 8 | (b) |
| A | 8 | 5 | No |
| B | 7 | 3 | No |
| C | 13 | 6 | No |
| D | 18 | 2 | No |
| E | 64 | 50 | Yes |

Notes
(a) Not tested. No arc propagation expected based on materials of construction and results for Examples 4-6.
(b) Not tested. No arc propagation expected since construction is identical to Example 6.

I claim:

1. A wire construction comprising a metallic electrically conductive core, a first fluoropolymer insulation layer surrounding the conductive core, a layer consisting essentially of fiber braid impregnated with a fluoropolymer resin surrounding the first insulation layer, the fiber braid consisting essentially of at least one polymeric material selected from the group consisting of polyaramide, PTFE and polyimide, and a second fluoropolymer insulation layer surrounding the braid, the first polymeric insulation layer, the resin impregnant in the fiber braid and the second polymeric insulation layer being fused.

2. A wire construction of claim 1 wherein the fluoropolymer of the first insulation layer is selected from PFA, PTFE and ETFE.

3. A wire construction of claim 1 wherein the braid consists essentially of polyaramid.

4. A wire construction of claim 1 wherein the braid consists essentially of PTFE.

5. A wire construction of claim 1 wherein the fluoropolymer of the second insulation layer is selected from PFA, PTFE and ETFE.

* * * * *